United States Patent [19]
Mizuno et al.

[11] Patent Number: 5,954,023
[45] Date of Patent: Sep. 21, 1999

[54] APPARATUS AND METHOD FOR CONTROLLING COMBUSTION IN INTERNAL COMBUSTION ENGINES

[75] Inventors: Hiroyuki Mizuno, Toyota; Shingo Kawasaki, Kariya, both of Japan

[73] Assignee: Toyota Jidosha Kabushiki Kaisha, Toyota, Japan

[21] Appl. No.: 08/990,731

[22] Filed: Dec. 15, 1997

[30] Foreign Application Priority Data

Dec. 18, 1996 [JP] Japan .................................. 8-338331

[51] Int. Cl.$^6$ .................................................. F02D 41/00
[52] U.S. Cl. ........................... 123/295; 123/299; 123/304
[58] Field of Search .................................. 123/295, 299, 123/300, 304, 478, 73 C

[56] References Cited

U.S. PATENT DOCUMENTS

| | | | |
|---|---|---|---|
| 4,955,339 | 9/1990 | Sasaki et al. | 123/295 |
| 5,078,107 | 1/1992 | Morikawa | 123/295 |
| 5,732,674 | 3/1998 | Motoyama et al. | 123/299 |
| 5,785,031 | 7/1998 | Akimoto et al. | 123/295 |

FOREIGN PATENT DOCUMENTS

| | | |
|---|---|---|
| A-4-237854 | 8/1992 | Japan . |
| A-5-52145 | 3/1993 | Japan . |
| A-9-195839 | 7/1997 | Japan . |

*Primary Examiner*—Willis R. Wolfe
*Assistant Examiner*—Hieu T. Vo
*Attorney, Agent, or Firm*—Oliff & Berridge, PLC

[57] ABSTRACT

An engine that selects the combustion mode from a number of combustion modes. The engine includes a fuel supplying device that supplies fuel directly into its cylinders. A detecting device detects the operating condition of the engine. A computing device computes the actual engine load based on the detected operating conditions. An apparatus for controlling combustion controls the fuel supplying device by selecting the combustion mode in accordance with the actual engine load.

17 Claims, 5 Drawing Sheets

APPARATUS AND METHOD FOR CONTROLLING COMBUSTION IN INTERNAL COMBUSTION ENGINES

BACKGROUND OF THE INVENTION

The present invention relates to an apparatus and method for controlling combustion in internal combustion engines, and more particularly, to an apparatus and method for controlling combustion in an internal combustion engine that injects fuel directly into its cylinders and that shifts combustion modes.

In a typical engine, fuel is injected into an intake port by a fuel injection valve to charge the associated combustion chamber with a uniform mixture of fuel and air. In the engine, an air intake passage is opened and closed by a throttle valve, which is operated in cooperation with an acceleration pedal. The opening of the throttle valve adjusts the intake air amount (and ultimately the amount of uniformly mixed air and fuel) that is supplied to the combustion chambers of the engine. This controls engine power.

However, when performing uniform (homogeneous) charge combustion, the throttling action of the throttle valve drastically decreases the pressure in the intake passage. This increases pumping losses and decreases efficiency. Stratified charge combustion solves such problems. In stratified charge combustion, the throttle valve is opened wide, and fuel is supplied directly into each combustion chamber. This delivers a rich, highly combustible air-fuel mixture to the vicinity of the spark plug and enhances ignitability.

Japanese Unexamined Patent Publication No. 5-52145 describes an apparatus that injects fuel directly into the combustion chamber defined in each engine cylinder. The apparatus computes a basic fuel injection amount, which is a theoretical value representing the engine load, from the engine speed and the depression degree of the acceleration pedal. The apparatus compares the basic fuel injection amount with a shift value and shifts the combustion mode between stratified charge combustion and semi-stratified charge combustion.

Stratified charge combustion is performed when the basic fuel injection amount is less than the shift value. When performing stratified charge combustion, fuel is injected into the combustion chamber during a late stage of the compression stroke. The fuel is concentrated around the spark plug and ignited. Semi-stratified charge combustion is performed when the basic fuel injection amount is greater than the shift value. When performing semi-stratified charge combustion, fuel is injected into the combustion chamber during the intake stroke and then during the late stage of the compression stroke. The divided injection decreases the amount of fuel concentrated around the spark plug. In this state, the fuel is ignited.

In a system that obtains the basic fuel injection amount based on the depression degree of the acceleration pedal, the value of the basic fuel injection amount changes drastically when the acceleration pedal is depressed in a sudden manner. However, when the depression degree of the acceleration pedal changes suddenly, the amount of air drawn into the combustion chamber does not increase in correspondence with the sudden fluctuation of the basic fuel injection amount. Thus, injection of fuel corresponding to the basic fuel injection amount, which is computed from the depression degree of the acceleration pedal, during rapid acceleration or deceleration of the engine, may cause the air-fuel mixture to become rich or lean.

Therefore, in the prior art, the basic injection fuel amount is graded to vary gradually when the depression degree of the acceleration pedal changes suddenly. That is, a graded fuel injection amount is obtained. An amount of fuel corresponding to the graded fuel injection amount is injected from the fuel injection valve. Therefore, the amount of fuel injected from the fuel injection valve optimally corresponds with the delayed increase in the amount of intake air. This maintains the air-fuel ratio at an optimal value.

However, in the apparatus that shifts combustion modes, the basic fuel injection amount is referred to when determining the combustion mode. Thus, if the depression degree of the acceleration pedal changes suddenly when the basic fuel injection amount is close to the shift value, the basic fuel injection amount may move to the other side of the shift value even if the graded fuel injection amount does not. This shifts the combustion mode to a mode that is inappropriate for the actual conditions. As a result, the amount of injected fuel may be inappropriate for the amount of available air. Such excessive or insufficient fuel injection amount leads to engine power fluctuations or misfires in the engine.

SUMMARY OF THE INVENTION

Accordingly, it is an objective of the present invention to provide an apparatus and method for optimally controlling engine combustion regardless of the conditions and for always injecting an appropriate amount of fuel.

To achieve the above objective, in a first aspect of the present invention, an internal combustion engine having a cylinder is provided. The engine operates in a combustion mode selected from a plurality of different combustion modes to burn fuel in the cylinder. The engine includes a fuel supplying device for supplying the fuel into the cylinder. A condition detecting means detects operating conditions of the engine. A computer computes a current value of an engine load in response to detected operating conditions. A combustion controller controls the fuel supplying device by selecting a desired combustion mode in response to the computed current load value.

In a second aspect of the present invention, a method for burning fuel in a cylinder of an internal combustion engine is provided. The engine operates in a combustion mode selected from a plurality of different combustion modes. The method includes the steps of supplying the fuel into the cylinder, detecting operating conditions of the engine, computing a current value of an engine load in response to the detected operating conditions, and controlling the fuel supply by selecting a desired combustion mode in response to the computed current load value.

Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

DETAILED DESCRIPTION OF THE PREFERRED EMBODIMENTS

A combustion control apparatus for an automotive engine will now be described with reference to the drawings.

Figure 1:
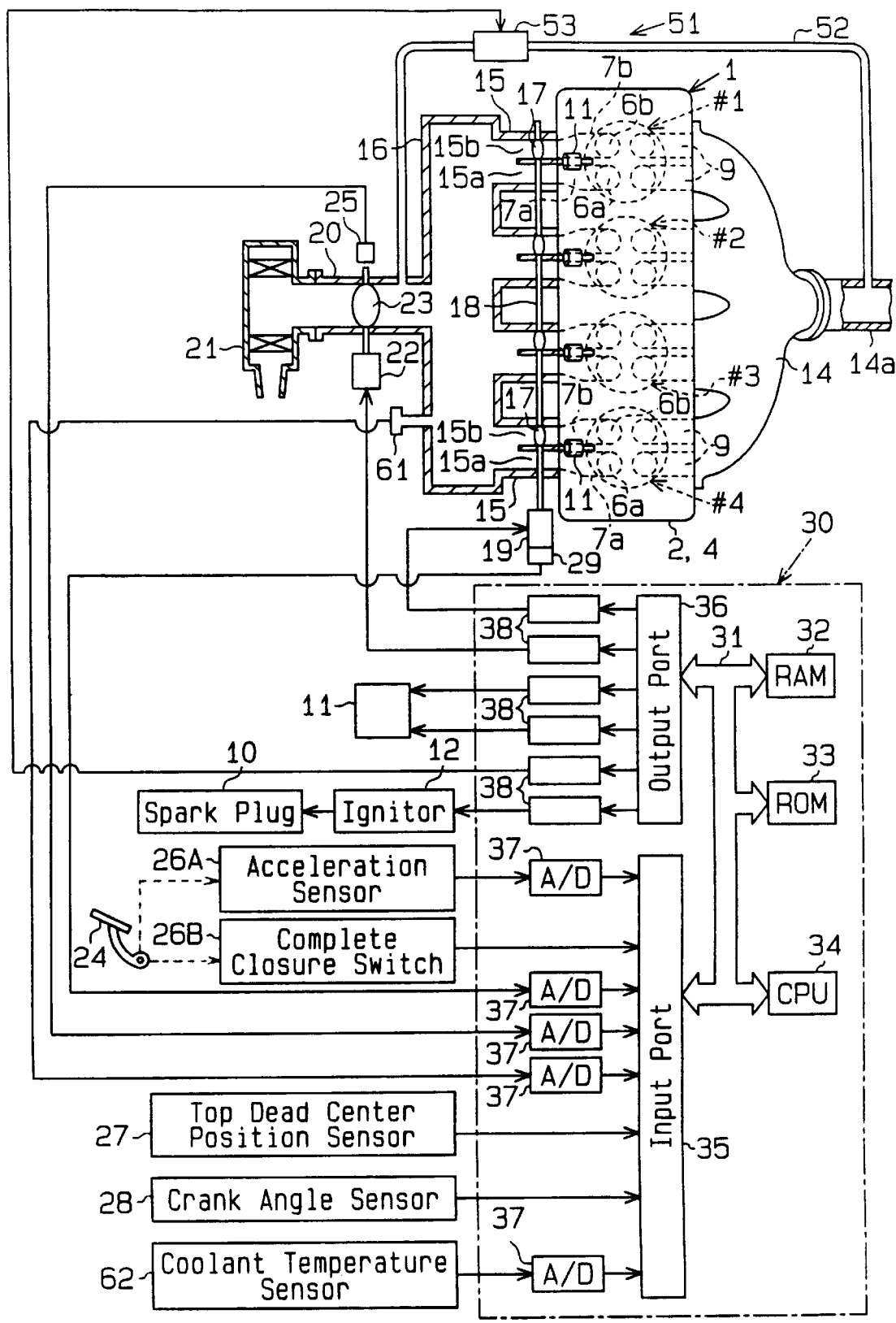
FIG. 1 is a schematic view and block diagram showing an engine combustion control apparatus according to the present invention.
Figure 2:
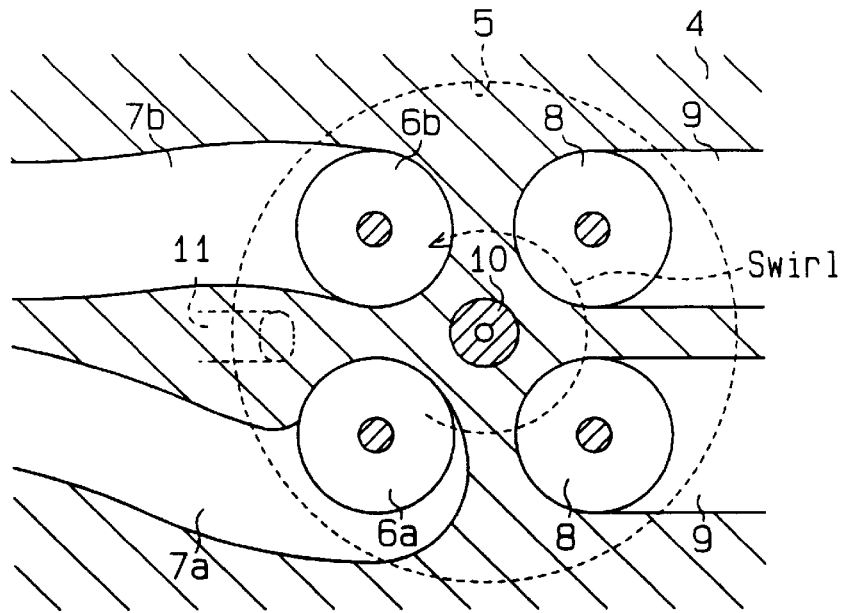
FIG. 2 is an enlarged schematic cross-sectional view showing a cylinder of the engine of FIG. 1.

FIG. 1 is a schematic view showing a combustion control apparatus of an automotive engine that injects fuel directly into its cylinders. An engine 1 has, for example, four cylinders #1, #2, #3, #4. The structure of the combustion chamber of each cylinder #1–#4 is shown in FIG. 2. As shown in these drawings, the engine 1 has a cylinder block 2 that accommodates pistons. The pistons are reciprocated in the cylinder block 2. A cylinder head 4 is arranged on top of the cylinder block 2. A combustion chamber 5 is defined between each piston and the cylinder head 4. Four valves (first intake valve 6a, second intake valve 6b, and two exhaust valves 8) are provided for each cylinder #1–#4. The first intake valve 6a is connected with a first intake port 7a while the second intake valve 6b is connected with a second intake port 7b. Each exhaust valve 8 is connected with an exhaust port 9.

As shown in FIG. 2, the first intake port 7a is a helical port that extends in a helical manner. The second intake port 7b extends in a generally straight manner. Spark plugs 10 are arranged at the middle of the cylinder head 4. High voltage is applied to each spark plug 10 by an ignitor 12 through a distributor (not shown). The ignition timing of each spark plug 10 is determined by the output timing of the high voltage sent from the ignitor 12. A fuel injection valve 11 is arranged near the inner wall of the cylinder head in the vicinity of each set of first and second intake valves 6a, 6b. Each fuel injection valve 11 is used to inject fuel directly into the associated cylinder #1–#4.

As shown in FIG. 1, the first and second intake ports 7a, 7b of each cylinder #1–#4 are connected to a surge tank 16 by a first intake passage 15a and a second intake passage 15b, which are defined in an intake manifold 15. A swirl control valve 17 is arranged in each second intake passage 15b. The swirl control valves 17 are connected to, for example, a step motor 19 by a common shaft 18. The step motor 19 is controlled by signals sent from an electronic control unit (ECU) 30.

The surge tank 16 is connected to an air cleaner 21 through an intake duct 20. An electronically controlled throttle valve 23, which is opened and closed by a step motor 22, is arranged in the intake duct 20. The ECU 30 sends signals to drive the step motor 22 and open and close the throttle valve 23. The throttle valve 23 adjusts the amount of intake air that passes through the intake duct 20 and enters the combustion chambers 5.

A throttle sensor 25 is arranged in the vicinity of the throttle valve 23 to detect the opening angle (throttle angle) of the valve 23. The exhaust ports 9 of each cylinder #1–#4 are connected to an exhaust manifold 14. After combustion, the exhaust gas is sent to an exhaust duct 14a through the exhaust manifold 14.

A conventional exhaust gas recirculation (EGR) mechanism 51 recirculates some of the exhaust gas through an EGR passage 52. An EGR valve 53 is arranged in the EGR passage 52. The EGR passage 52 connects the downstream side of the throttle valve 23 in the intake duct 20 to the exhaust duct 14a. The EGR valve 53 includes a valve seat, a valve body, and a step motor (none of which is shown). The opening area of the EGR valve 53 is altered by causing the step motor to intermittently displace the valve body with respect to the valve seat. When the EGR valve 53 opens, some of the exhaust gas sent into the exhaust duct 14a enters the EGR passage 52. The exhaust gas is then drawn into the intake duct 20 through the EGR valve 53. In other words, some of the exhaust gas is recirculated by the EGR mechanism 51 and returned to the air-fuel mixture. The recirculation amount of the exhaust gas (EGR amount) is adjusted by the opening amount of the EGR valve 53.

The ECU 30 is a digital computer provided with a random access memory (RAM) 32, a read only memory (ROM) 33, a central processing unit (CPU) 34, which is a microprocessor, an input port 35, and an output port 36. The input and output ports 35, 36 are connected to one another by a bidirectional bus 31.

An acceleration pedal 24, which operates the throttle valve 23, is connected to an acceleration sensor 26A. The acceleration sensor 26A generates a voltage proportional to the depression degree of the acceleration pedal 24 and thus detects the degree of acceleration pedal depression ACCP. The voltage output by the acceleration sensor 26A is input into the input port 35 by way of an analog to digital (A/D) converter 37. The acceleration pedal 24 is also provided with a complete closure switch 26B to detect when the pedal 24 is not pressed at all. The closure switch 26B outputs a complete closure signal of one when the acceleration pedal 24 is not pressed at all and outputs a complete closure signal of zero when the acceleration pedal 24 is pressed. The output voltage of the closure switch 26B is also input to the input port 35.

A top dead center position sensor 27 generates an output pulse when, for example, the piston in the first cylinder #1 reaches the top dead center position during the intake stroke. The output pulse is input to the input port 35. A crank angle sensor 28 generates an output pulse, which is input to the input port 35, each time the crankshaft of the engine 1 is rotated by a crank angle CA of 30 degrees. The CPU 34 reads the output pulses sent from the top dead center position sensor 27 and the crank angle sensor 28 to compute the engine speed NE.

The rotational angle of the shaft 18 is detected by a swirl control valve sensor 29 to measure the opening angle of the swirl control valves 17. The signal output of the swirl control valve sensor 29 is input to the input port 35 by way of an A/D converter 37.

The throttle sensor 25 detects the throttle angle TA. The signal output of the throttle sensor 25 is input to the input port 35 by way of an A/D converter 37.

An intake pressure sensor 61 is provided to detect the pressure in the surge tank 16 (intake pressure PM). A coolant temperature sensor 62 is provided in the engine 1 to detect the temperature of the engine coolant (coolant temperature). The signal outputs of the sensors 61, 62 are input to the input port 35 by way of A/D converters 37.

The output port 36 is connected to the fuel injection valves 11, the step motors 19, 22, the ignitor 12, and the step motor of the EGR valve 53 by way of drive circuits 38. The ECU 30 controls the fuel injection valves 11, the step motors 19, 22, the ignitor 12, and the EGR valve 53 with control programs stored in the ROM 33 based on signals sent from the sensors 25–29 and 61-62.

The combustion mode control carried out by the combustion control apparatus will now be described with reference to the flowcharts of FIGS. 4–6.

Figure 4:
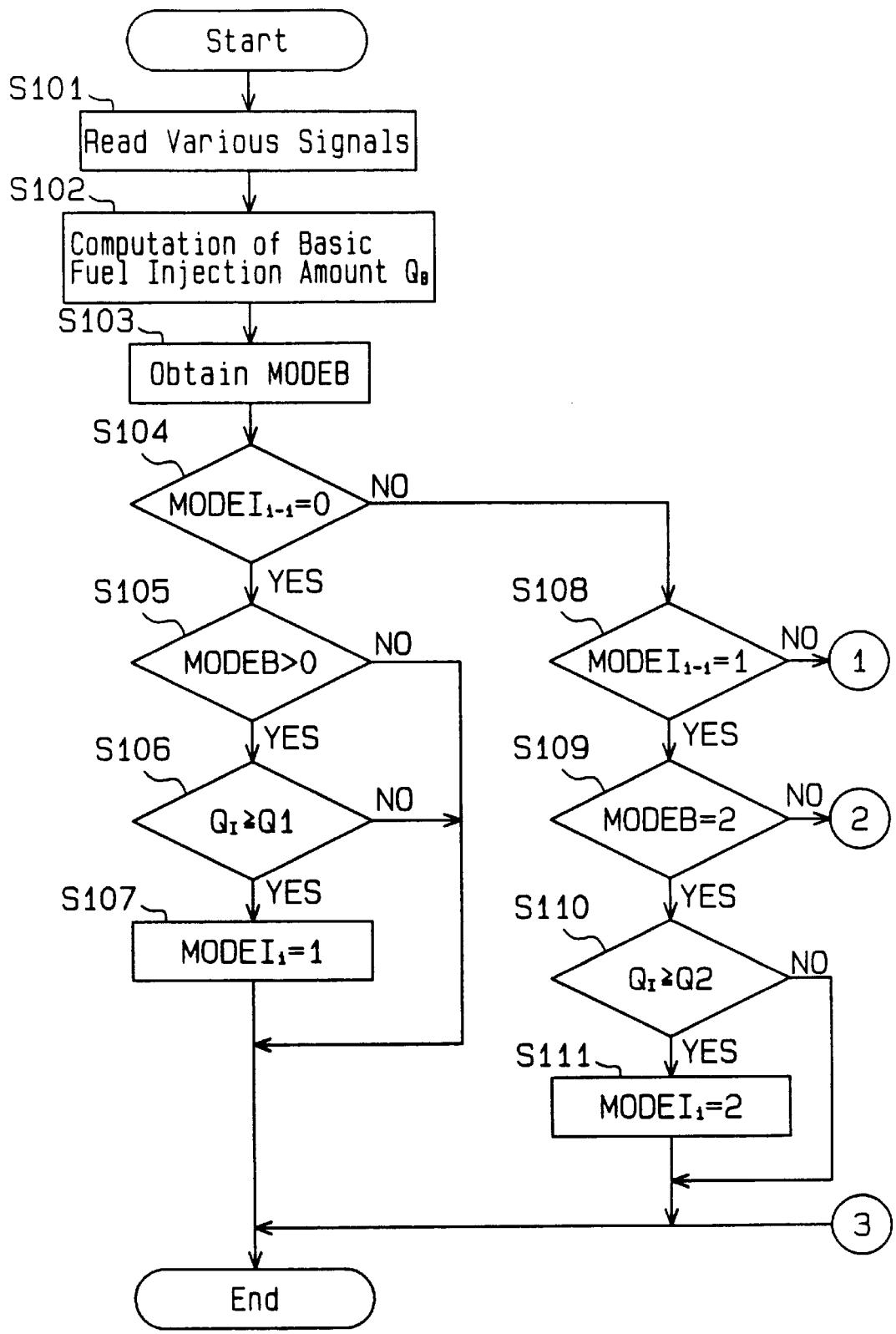
FIG. 4 is a flowchart showing a routine for setting the actual combustion mode.
Figure 5:
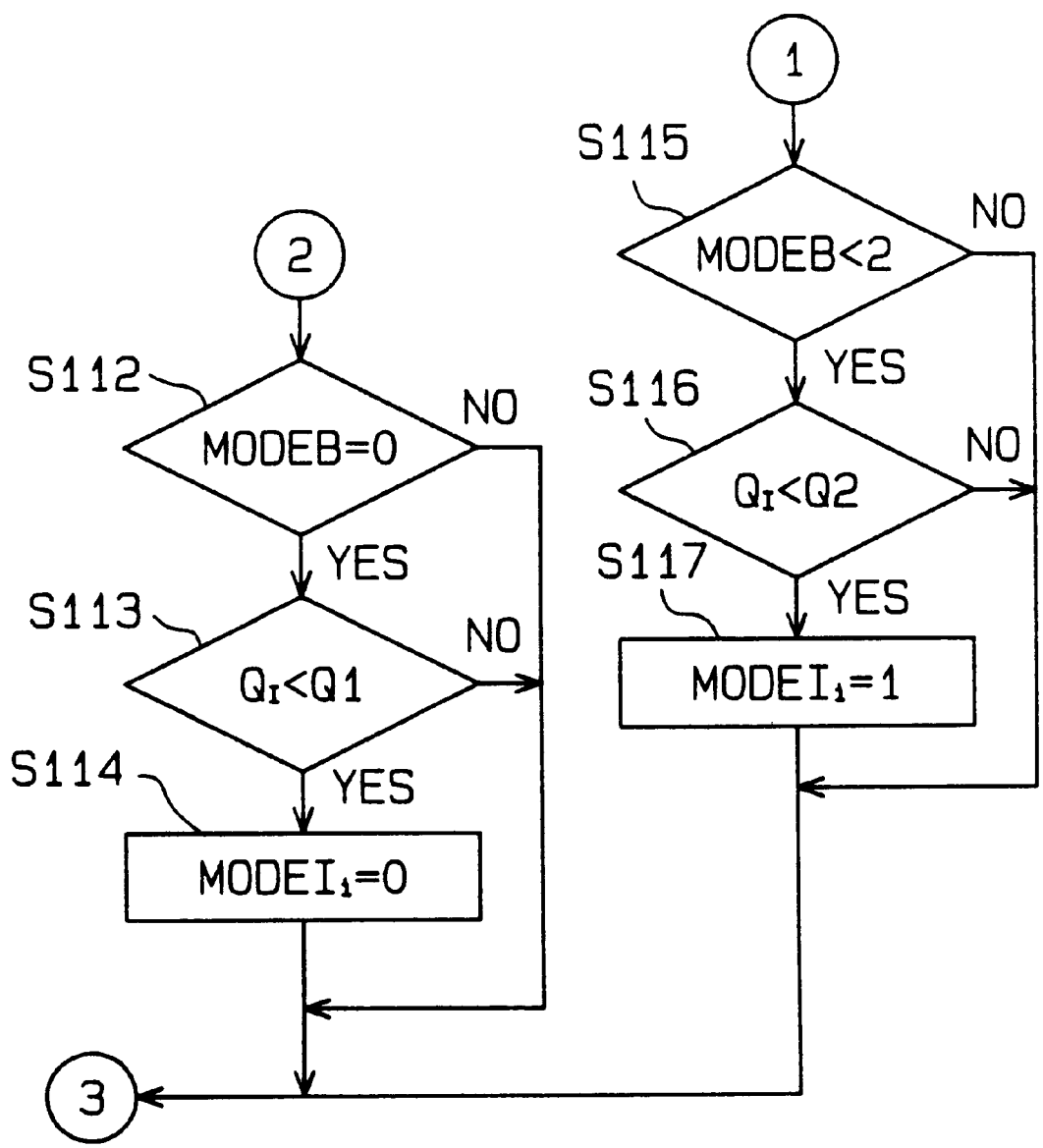
FIG. 5 is a continuation of the flowchart of FIG. 4 showing the routine for setting the actual combustion mode.
Figure 6:
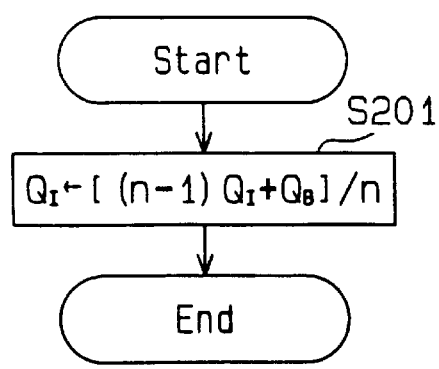
FIG. 6 is a flowchart showing the routine for computing the graded fuel injection amount.

FIGS. 4 and 6 show a flowchart of a routine executed by the ECU 30 and used to determine the actual combustion mode, or first mode MODEI. The first mode MODEI corresponds to the actual operating state of the engine 1 and is selected from three combustion modes, which are stratified charge combustion, semi-stratified charge combustion, and homogeneous charge combustion. For example, when MODEI is zero, stratified charge combustion is indicated. When MODEI is one, semi-stratified charge combustion is indicated. When MODEI is two, homogeneous charge combustion is indicated. The fuel injection valves 11, the swirl control valves 17, the ignition system, and the like are controlled in accordance with the first mode MODEI.

Stratified charge combustion is performed by injecting fuel into the combustion chamber during a late stage of the compression stroke. The fuel is concentrated around the spark plug and ignited. Semi-stratified charge combustion is performed by injecting fuel into the combustion chamber during the intake stroke and then, again, during a late stage of the compression stroke. The decreased concentration of fuel around the spark plug, in comparison with the stratified charge combustion, is ignited afterward. Homogeneous charge combustion is performed by injecting fuel into the combustion chamber during the intake stroke.

When entering the routine, at step S101, the ECU 30 reads the signals from the sensors 25–29 that indicate the engine speed NE, the acceleration pedal depression degree ACCP, and other information. The ECU 30 then proceeds to step S102 and obtains the basic fuel injection amount $Q_B$ from a basic fuel injection map (not shown) in accordance with the engine speed NE, the acceleration pedal depression degree ACCP, and other information that has been read. The basic fuel injection amount $Q_B$ represents the theoretical load of the engine 1 in a normal state.

A routine for computing a graded fuel injection amount $Q_I$ corresponding to the basic fuel injection amount $Q_B$ will now be described with reference to the flowchart of FIG. 6. The ECU 30 executes this routine cyclically in an interrupting manner once for every predetermined crank angle or once for every predetermined time interval.

When entering this routine, at step S201, the ECU 30 corrects the basic fuel injection amount $Q_B$ and renews the graded fuel injection amount $Q_I$. More specifically, the ECU 30 multiplies the graded fuel injection amount $Q_I$ of the previous cycle by (n–1) (n is a constant). The obtained value is added to the basic fuel injection amount $Q_B$. The sum is then divided by n to obtain the graded fuel injection amount $Q_I$. The ECU 30 then temporarily terminates subsequent processing. The graded fuel injection amount $Q_I$ represents the actual load of the engine 1.

If the acceleration pedal depression degree ACCP is constant, the graded fuel injection amount $Q_I$, which is computed by correcting the basic fuel injection amount $Q_B$, is equal to the basic fuel injection amount $Q_B$. If the acceleration pedal depression degree ACCP increases suddenly during acceleration or decreases suddenly during deceleration, the basic fuel injection amount $Q_B$ changes drastically, as shown by solid line L1a, L1b in FIG. 7. The graded fuel injection amount $Q_I$ varies as shown by dotted line L2a, L2b. The graded fuel injection amount $Q_I$ changes more gradually than the basic fuel injection amount $Q_B$.

Therefore, if the acceleration pedal depression degree ACCP increases and decreases suddenly, the fuel injected from the fuel injection valves 11 corresponds to the graded fuel injection amount $Q_I$. The injection amount corresponds to the available amount of intake air and recirculated exhaust gas, changes in which are delayed in response to a sudden change of the acceleration pedal depression degree ACCP. Accordingly, the amount of fuel injected from the fuel injection valve 11 corresponds to the intake air. This enables the air-fuel mixture to be maintained at an optimal air-fuel ratio during rapid acceleration and deceleration.

Figure 3:
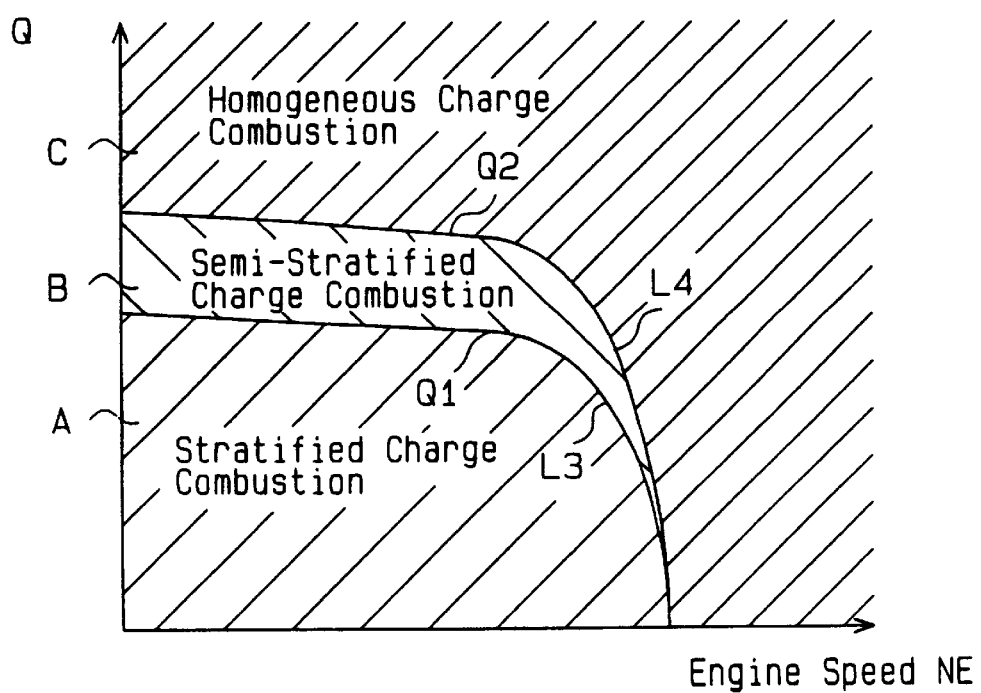
FIG. 3 is a combustion mode map used to determine the combustion mode.

Returning to the routine for determining the first mode MODEI, after computing the basic fuel injection amount $Q_B$ in step S102, the ECU 30 proceeds to step S103. At step S103, the ECU 30 determines the basic combustion mode, or second mode MODEB, in accordance with the engine speed NE and the basic fuel injection amount $Q_B$ by referring to the mode map shown in FIG. 3. The mode map includes ranges A, B, and C. The fuel injection amount Q1 between range A and range B (first boundary amount) varies as shown by solid line L3. The fuel injection amount Q2 between range B and range C (second boundary amount) varies as shown by solid line L4.

If the engine speed NE and the basic fuel injection amount $Q_B$ are in range A, stratified charge combustion is preferred. In this case, the ECU 30 sets the second mode MODEB at zero (stratified charge combustion). In the same manner, if the engine speed NE and the basic fuel injection amount $Q_B$ are in range B, semi-stratified charge combustion is preferred. Hence, the ECU 30 sets the second mode MODEB at one (semi-stratified charge combustion). If the engine speed NE and the basic fuel injection amount $Q_B$ are in range C, homogeneous charge combustion is preferred. In this case, the ECU 30 sets the second mode MODEB at two (homogeneous charge combustion). When the routine is run for the first time after the engine 1 is started, $MODEI_{i-1}$ is given an initial value, which may be the initial value of MODEB.

At step S104, the ECU 30 judges whether or not the first mode $MODEI_{i-1}$ of the previous cycle is set at zero (stratified charge combustion). If the first mode $MODEI_{i-1}$ is set at zero; the ECU 30 proceeds to step S105 and judges whether or not the second mode MODEB is greater than zero. If the second mode MODEB is not greater than zero, the ECU 30 temporarily terminates this routine. If the second mode MODEB is greater than zero, the ECU 30 proceeds to step S106.

At step S106, the ECU 30 determines whether or not the graded fuel injection amount $Q_I$ is equal to or greater than the first boundary amount Q1. If the graded fuel injection amount $Q_I$ is smaller than the fuel injection amount Q1, the ECU 30 temporarily terminates subsequent processing. If the graded fuel injection amount $Q_I$ is equal to or greater than the fuel injection amount Q1, the ECU 30 proceeds to step S107. At step S107, the ECU 30 sets the present first mode $MODEI_i$ to one (semi-stratified charge combustion). This shifts the combustion mode of the engine 1 to semi-stratified charge combustion from stratified charge combustion.

Figure 7:
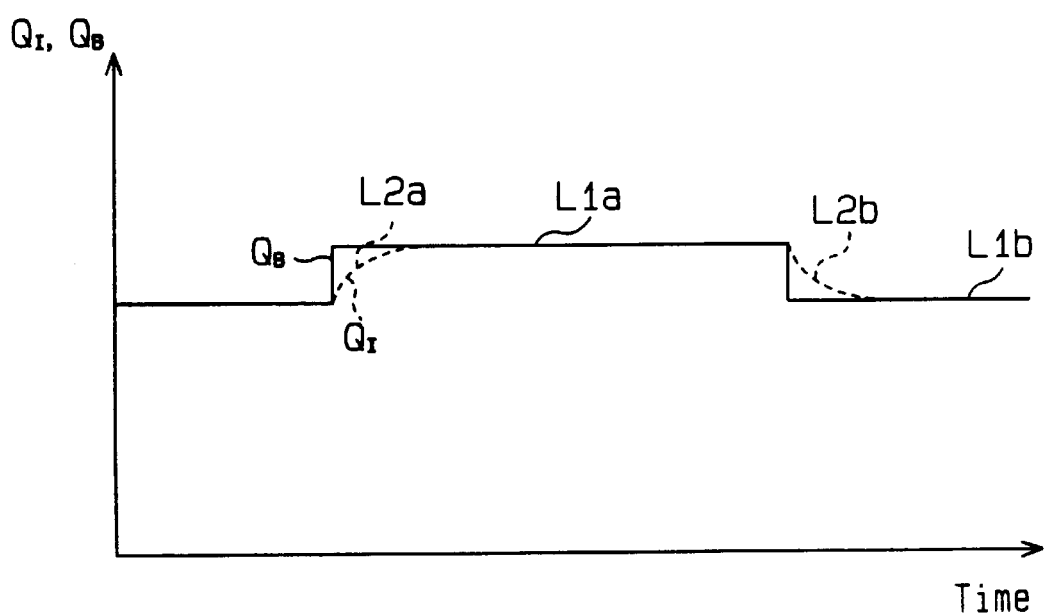
FIG. 7 is a time chart showing the shifting of the basic fuel injection amount and the graded fuel injection fuel amount during acceleration and deceleration.

When the acceleration pedal depression degree ACCP increases suddenly during acceleration, the basic fuel injection amount $Q_B$ increases as shown by solid line L1a in FIG. 7. This causes the graded fuel injection amount $Q_I$ to be smaller than the basic fuel injection amount $Q_B$. Accordingly, if the acceleration pedal depression degree ACCP is increased suddenly when the basic fuel injection amount $Q_B$ is close to the first boundary amount Q1, the graded fuel injection amount $Q_I$ may not be equal to or greater than the first boundary amount Q1 even if the basic fuel injection amount $Q_B$ is equal to or greater than the first boundary amount Q1. In such case, the preferred combustion mode is stratified charge combustion.

Therefore, in the preferred and illustrated embodiment, the ECU 30 executes step S106 to wait until the graded fuel injection amount $Q_I$, which is the actual fuel injection amount, becomes equal to or greater than the first boundary amount Q1 before shifting the combustion mode. The combustion mode is shifted from stratified charge combustion to semi-stratified charge combustion only after the graded fuel injection amount $Q_I$ becomes equal to or greater than the first boundary amount Q1. Thus, the combustion mode performed in the engine 1 is the appropriate combustion mode. This prevents misfires that would be caused if the fuel injection amount is excessive or insufficient with respect to the optimal fuel injection amount.

In step S104, if the first mode $MODEI_{i-1}$ of the previous cycle is not set at zero, the ECU 30 proceeds to step S108 and judges whether or not the first mode $MODEI_{i-1}$ of the previous cycle is set at one (semi-stratified charge combustion). If the first mode $MODEI_{i-1}$ is set at one, the ECU 30 proceeds to step S109. At step S109, the ECU 30 judges whether the second mode MODEB is set at two. If the second mode MODEB is set at two in step S109, the ECU 30 proceeds to step S110 and judges whether or not the graded fuel injection amount $Q_I$ is equal to or greater than the second boundary amount Q2. If the graded fuel injection amount $Q_I$ is smaller than the second boundary amount Q2, the ECU 30 temporarily terminates subsequent processing. If the graded fuel injection amount $Q_I$ is equal to or greater than he second boundary amount Q2, the ECU 30 proceeds to step S111 and sets the present first mode $MODEI_i$ to two (homogeneous charge combustion). This shifts the combustion mode of the engine 1 to homogeneous charge combustion from semi-stratified charge combustion.

If the acceleration pedal depression degree ACCP is increased suddenly when the basic fuel injection amount $Q_B$ is close to the second boundary amount Q2, the graded fuel injection amount $Q_I$ may not be equal to or greater than the second boundary amount Q2 even if the basic fuel injection amount $Q_B$ is equal to or greater than the second boundary amount Q2. In such case, the preferred combustion mode is semi-stratified charge combustion.

Therefore, in the preferred and illustrated embodiment, the ECU 30 executes step S110 to wait until the graded fuel injection amount $Q_I$, which is the actual fuel injection amount, becomes equal to or greater than the second boundary amount Q2 before shifting the combustion mode. The combustion mode is shifted from semi-stratified charge combustion to homogeneous charge combustion only after the graded fuel injection amount $Q_I$ becomes equal to or greater than the second boundary amount Q2. Thus, the combustion mode performed in the engine 1 coincides with the appropriate combustion mode. This prevents misfires that would be caused if the fuel injection amount is excessive or insufficient with respect to the optimal fuel injection amount.

In step S109, if the second mode MODEB is not set at two, the ECU 30 proceeds to step S112 (FIG. 5) and judges whether or not the second mode MODEB is set at zero. If the second mode MODEB is not set at zero, the ECU 30 temporarily terminates subsequent processing. If the second mode MODEB is set at zero, the ECU 30 proceeds to step S113. At step S113, the ECU 30 judges whether or not the graded fuel injection amount $Q_I$ is smaller than the first boundary amount Q1. If the graded fuel injection amount $Q_I$ is equal to or greater than the fuel injection amount Q1, the ECU 30 temporarily terminates subsequent processing. In step S113, if it is determined that the graded fuel injection amount $Q_I$ is smaller than the fuel injection amount Q1, the ECU 30 proceeds to step S114 and sets the present first mode $MODEI_i$ to zero (stratified charge combustion). This shifts the combustion mode of the engine 1 to stratified charge combustion from semi-stratified charge combustion.

When the acceleration pedal depression degree ACCP decreases suddenly during deceleration, the basic fuel injection amount $Q_B$ decreases as shown by solid line L1$b$ in FIG. 7. This causes the graded fuel injection amount $Q_I$ to be greater than the basic fuel injection amount $Q_B$. Accordingly, if the acceleration pedal depression degree ACCP is decreased suddenly when the basic fuel injection amount $Q_B$ is close to the first boundary amount Q1, the graded fuel injection amount $Q_I$ may not be smaller than the first boundary amount Q1 even if the basic fuel injection amount $Q_B$ is smaller than the first boundary amount Q1. In such case, the preferred combustion mode is semi-stratified charge combustion.

Therefore, in the preferred and illustrated embodiment, the ECU 30 executes step S113 to wait until the graded fuel injection amount $Q_I$, which is the actual fuel injection amount, becomes smaller than the first boundary amount Q1 before shifting the combustion mode. The combustion mode is shifted from semi-stratified charge combustion to stratified charge combustion only after the graded fuel injection amount $Q_I$ becomes smaller than the first boundary amount Q1. Thus, the combustion mode performed in the engine 1 is the appropriate combustion mode. This prevents misfires that would be caused if the fuel injection amount is excessive or insufficient with respect to the optimal fuel injection amount.

In step S108, if it is determined that the first mode $MODEI_{i-1}$ is not set at one, the ECU 30 proceeds to step S115 (FIG. 5) and judges whether or not the second mode MODEB is smaller than two. If the second mode MODEB is equal to two, the ECU 30 temporarily terminates subsequent processing. If the second mode MODEB is smaller than two, the ECU 30 proceeds to step S116. At step S116, the ECU 30 judges whether or not the graded fuel injection amount $Q_I$ is smaller than the second boundary amount Q2. If the graded 5 fuel injection amount $Q_I$ is equal to or greater than the second boundary amount Q2, the ECU 30 temporarily terminates subsequent processing. If it is determined that the graded fuel injection amount $Q_I$ is smaller than the fuel injection amount Q2, the ECU 30 proceeds to step S117 and sets the present first mode $MODEI_i$ to one (semi-stratified charge combustion). This shifts the combustion mode of the engine 1 to semi-stratified charge combustion from homogeneous charge combustion.

If the acceleration pedal depression degree ACCP is decreased suddenly when the basic fuel injection amount $Q_B$ is close to the second boundary amount Q2, the graded fuel injection amount $Q_I$ may not be smaller than the second boundary amount Q2 even if the basic fuel injection amount $Q_B$ is smaller than the second boundary amount Q2. In such case, the preferred combustion mode is homogeneous charge combustion.

Therefore, in the preferred and illustrated embodiment, the ECU 30 executes step S116 to wait until the graded fuel injection amount $Q_I$, which is the actual fuel injection amount, becomes smaller than the second boundary amount $Q2$ before shifting the combustion mode. The combustion mode is shifted from homogeneous charge combustion to semi-stratified charge combustion only after the graded fuel injection amount $Q_I$ becomes smaller than the second boundary amount $Q2$. Thus, the combustion mode performed in the engine 1 is the appropriate combustion mode. This prevents misfires that would be caused if the fuel injection amount is excessive or insufficient with respect to the optimal fuel injection amount.

The advantages of the preferred and illustrated embodiment will now be described.

The shifting of the combustion mode is based on the graded fuel injection amount $Q_I$ even if the basic fuel injection amount $Q_B$ differs from the graded fuel injection amount $Q_I$ as a result of grading during acceleration or deceleration. Thus, the combustion mode is shifted so that the engine 1 positively performs the appropriate combustion mode. Thus, shifting of the combustion mode during acceleration or deceleration results in the injection of the appropriate amount of fuel. This prevents misfires that would be caused if the fuel injection amount is excessive or insufficient with respect to the optimal fuel injection amount.

The combustion mode is not shifted until the graded fuel injection amount $Q_I$ moves beyond the first or second boundary amount $Q1$, $Q2$ even if the basic fuel injection amount $Q_B$ moves beyond the first or second boundary amount $Q1$, $Q2$. The combustion mode is shifted only when the conditions for shifting are satisfied. That is, the combustion mode is shifted only when the graded fuel injection amount $Q_I$ moves beyond the first or second boundary amount $Q1$, $Q2$. Thus, the combustion mode performed in the engine 1 is always appropriate. This prevents misfires that would be caused if the fuel injection amount is excessive or insufficient with respect to the optimal fuel injection amount.

It should be apparent to those skilled in the art that the present invention may be embodied in many other specific forms without departing from the spirit or scope of the invention. Particularly, it should be understood that the invention may be embodied in the following forms.

In the preferred and illustrated embodiment, the basic fuel injection amount $Q_B$ is graded to obtain the graded fuel injection amount $Q_I$. An amount of fuel corresponding to the graded fuel injection amount $Q_I$ is then injected from the fuel injection valve 11. However, instead of such structure, an actual fuel injection amount may be computed based on the air intake amount. In this case, an amount of fuel corresponding to the actual fuel injection amount is injected from the fuel injection valve 11. Thus, if the acceleration pedal depression degree ACCP increases or decreases in a sudden manner during acceleration or deceleration, an amount of fuel appropriately corresponding with the air intake amount (which follows the depression degree ACCP in a delayed manner) is injected. By shifting the combustion mode based on the computed actual fuel injection amount, the engine 1 positively performs the appropriate combustion mode. Accordingly, this structure also prevents misfires and engine power fluctuations that would be caused if the fuel injection amount becomes excessive or insufficient with respect to the optimal fuel injection amount during acceleration or deceleration.

In the preferred and illustrated embodiment, the present invention is applied to an engine that injects fuel directly into its cylinders. However, the present invention may be applied to an engine that does not inject fuel directly into its cylinders, but shifts the combustion mode between stratified charge combustion, semi-stratified charge combustion, and homogeneous charge combustion. For example, the present invention may be applied to an engine that injects fuel toward the stems of the valve heads of the intake valves 6a, 6b.

In the preferred and illustrated embodiment, the combustion mode is shifted between the three modes of stratified charge combustion, semi-stratified charge combustion, and homogeneous charge combustion. However, the combustion mode may be shifted between two modes. For example, the combustion mode may be alternated between stratified charge combustion and semi-stratified charge combustion, between semi-stratified charge combustion and homogeneous charge combustion or between stratified charge combustion and homogeneous charge combustion.

In the preferred and illustrated embodiment, helical type intake ports are employed to produce swirls. However, swirls do not necessarily have to be produced. In such case, parts such as the swirl control valve 17 and the step motor 19 may be eliminated.

The present invention is applied to a gasoline engine in the preferred and illustrated embodiment. However, the present invention may also be applied to other types of engines such as diesel engines.

Therefore, the present examples and embodiments are to be considered as illustrative and not restrictive and the invention is not to be limited to the details given herein, but may be modified within the scope and equivalence of the appended claims.

What is claimed is:

1. An internal combustion engine having a cylinder, wherein the engine operates in a combustion mode selected from a plurality of different combustion modes to burn fuel in the cylinder, the engine comprising:

a fuel supplying device for supplying the fuel into the cylinder;

condition detecting means for detecting operating conditions of the engine;

a computer for computing a current value of an engine load in response to detected operating conditions, wherein the computer computes a graded fuel injection amount by grading a basic fuel injection amount, which is indicative of a theoretical engine load, in a predetermined manner, wherein the graded fuel injection amount represents the current value of the engine load; and a combustion controller for controlling the fuel supplying device by selecting a desired combustion mode in response to the computed current load value.

2. The engine according to claim 1, wherein the fuel supplying device is a fuel injector for injecting the fuel into the cylinder.

3. The engine according to claim 2, wherein the engine has an output shaft and wherein the combustion modes are predetermined according to certain ranges of the rotational speed of the output shaft and the amount of fuel to be injected.

4. The engine according to claim 2, wherein the combustion modes include stratified charge combustion, semi-stratified charge combustion and homogeneous charge combustion.

5. The engine according to claim 4, wherein the combustion controller activates the injector at a late stage of the compression stroke to execute stratified charge combustion, activates the injector during the intake stroke and at a late stage of the compression stroke to execute semi-stratified charge combustion, and activates the injector during the intake stroke to execute homogeneous charge combustion.

6. The engine according to claim 4, wherein the combustion modes are employed in order of stratified charge combustion, semi-stratified charge combustion and homogeneous charge combustion as the fuel injection amount increases.

7. The engine according to claim 6, wherein stratified charge combustion range and semi-stratified charge combustion range are demarcated by a first boundary amount of the fuel injection, and wherein the combustion controller switches the combustion mode from stratified charge combustion to semi-stratified charge combustion when the graded fuel injection amount exceeds the first boundary amount of the fuel injection.

8. The engine according to claim 6, wherein semi-stratified charge combustion range and homogeneous charge combustion range are demarcated by a second boundary amount of the fuel injection, and wherein the combustion controller switches the combustion mode from semi-stratified charge combustion to homogeneous charge combustion when the graded fuel injection amount exceeds the second boundary amount of the fuel injection.

9. The internal combustion engine according to claim 1, wherein said combustion modes include stratified charge combustion, semi-stratified charge combustion and homogeneous charge combustion and the fuel supplying device is a fuel injector.

10. The engine according to claim 9, wherein the engine has an output shaft and wherein the combustion modes are predetermined according to certain ranges of the rotational speed of the output shaft and the amount of fuel to be injected.

11. The engine according to claim 9, wherein the combustion controller activates the fuel injector at a late stage of the compression stroke to execute stratified charge combustion, activates the fuel injector during the intake stroke and at a late stage of the compression stroke to execute semi-stratified charge combustion, and activates the fuel injector during the intake stroke to execute homogeneous charge combustion.

12. The engine according to claim 9, wherein the combustion modes are employed in order of stratified charge combustion, semi-stratified charge combustion and homogeneous charge combustion as the fuel injection amount increases.

13. The engine according to claim 12, wherein stratified charge combustion range and semi-stratified charge combustion range are demarcated by a first boundary amount of the fuel injection, and wherein the combustion controller switches the combustion mode from stratified charge combustion to semi-stratified charge combustion when the graded fuel injection amount exceeds the first boundary amount of the fuel injection.

14. The engine according to claim 12, wherein semi-stratified charge combustion range and homogeneous charge combustion range are demarcated by a second boundary amount of the fuel injection, and wherein the combustion controller switches the combustion mode from semi-stratified charge combustion to homogeneous charge combustion when the graded fuel injection amount exceeds the second boundary amount of the fuel injection.

15. A method for burning fuel in a cylinder of an internal combustion engine, wherein the engine operates in a combustion mode selected from a plurality of different combustion modes, the method comprising the steps of:

supplying the fuel into the cylinder;

detecting operating conditions of the engine;

computing a current value of an engine load in response to the detected operating conditions, wherein the computing step includes computing a graded fuel injection amount by grading a basic fuel injection amount, which is indicative of a theoretical engine load, in a predetermined manner, wherein the graded fuel injection amount represents the current value of the engine load; and controlling the fuel supply by selecting a desired combustion mode in response to the computed current load value.

16. The method according to claim 15, wherein the engine operates in a combustion mode selected from a plurality of different combustion modes to burn the fuel, said combustion modes including stratified charge combustion, semi-stratified charge combustion and homogeneous charge combustion and the fuel is supplied into the cylinder by injecting the fuel into the cylinder.

17. The method according to claim 16, wherein the fuel injection is performed at a late stage of the compression stroke to execute stratified charge combustion, the fuel injection is performed in the intake stroke and at a late stage of the compression stroke to execute semi-stratified charge combustion, and the fuel injection is performed in the intake stroke to execute homogeneous charge combustion.

\* \* \* \* \*